(12) United States Patent  (10) Patent No.: US 8,869,062 B1
Voorhees et al.  (45) Date of Patent: Oct. 21, 2014

(54) GESTURE-BASED SCREEN-MAGNIFIED TOUCHSCREEN NAVIGATION

(71) Applicant: Freedom Scientific, Inc., St. Petersburg, FL (US)

(72) Inventors: Gerald Lee Voorhees, Tampa, FL (US); Robert Steinberger, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 14/091,753

(22) Filed: Nov. 27, 2013

(51) Int. Cl.
*G06F 3/048* (2013.01)
*G06F 3/0485* (2013.01)

(52) U.S. Cl.
CPC .................... *G06F 3/0485* (2013.01)
USPC ........................................................ 715/784

(58) Field of Classification Search
None
See application file for complete search history.

(56) References Cited

U.S. PATENT DOCUMENTS

| | | | |
|---|---|---|---|
| 8,209,606 B2 | 6/2012 | Ording | |
| 8,223,134 B1 | 7/2012 | Forstall et al. | |
| 8,255,798 B2 | 8/2012 | Ording | |
| 8,365,090 B2 | 1/2013 | Ording | |
| 8,368,665 B2 | 2/2013 | Forstall et al. | |
| 8,441,458 B2 | 5/2013 | Rimon et al. | |
| 2004/0125088 A1 | 7/2004 | Zimmerman et al. | |
| 2009/0073194 A1* | 3/2009 | Ording | 345/672 |
| 2010/0031152 A1* | 2/2010 | Villaron et al. | 715/731 |
| 2010/0251153 A1* | 9/2010 | SanGiovanni et al. | 715/767 |
| 2011/0013049 A1 | 1/2011 | Thorn | |
| 2011/0090255 A1 | 4/2011 | Wilson et al. | |
| 2011/0304772 A1* | 12/2011 | Dasher et al. | 348/581 |
| 2012/0023509 A1 | 1/2012 | Blumenberg | |
| 2012/0278754 A1 | 11/2012 | Lehmann et al. | |
| 2013/0311921 A1* | 11/2013 | Fleizach et al. | 715/767 |

\* cited by examiner

*Primary Examiner* — William Bashore
*Assistant Examiner* — Rayeez Chowdhury
(74) *Attorney, Agent, or Firm* — Anton J. Hopen; Andriy Lytvyn; Smith & Hopen, P.A.

(57) ABSTRACT

Screen magnification software on a touchscreen device detects when a low-vision user reaches the boundary of a magnified viewport. If additional canvas or menus lay on the other side of the boundary the present invention enables the low-vision user to maintain the same exploration gesture on the touchscreen while causing the underlying canvas to scroll into view in the direction of the gesture. This invention enables the low-vision user to navigate about the entire underlying canvas of a touchscreen graphic user interface with a single, intuitive touchscreen gesture even under magnification.

8 Claims, 13 Drawing Sheets

GESTURE-BASED SCREEN-MAGNIFIED TOUCHSCREEN NAVIGATION

BACKGROUND OF THE INVENTION

1. Field of the Invention

This invention relates to magnification of touchscreen displays. More specifically, it relates to software and methods to improve navigation of a touchscreen graphic user interface (GUI) while under magnification.

2. Brief Description of the Related Art

As technology has advanced, graphic displays have vastly improved in clarity and resolution. Not many years ago, 15 inch monitors displayed GUIs at VGA resolutions (640×480 pixels). However, portable, touchscreen displays like those sold under the KINDLE FIRE HDX brand provide resolutions on an 8.9 inch screen of 2560×1600 pixels or 339 pixels per inch density. The ability to present fonts, images and icons clearly at high resolutions has provided opportunities for interface and software designers to put more content on a single screen. However, as users move to touchscreen devices the screens themselves have become even smaller.

In conjunction with higher screen resolutions in smaller displays, another concurrent phenomenon is the method of navigation itself. From the 1980s to 2010 the most common tools for navigating a GUI were keyboard and mouse peripherals. In the most popular operating systems, icons were placed on a static desktop canvas defined by the resolution and size of the physical display monitor. By addition of one or more monitors, the desktop canvas could be expanded to provide more surface area. Nevertheless, this canvas was static and limited the surface area upon which icons and other control objects could be placed. While the desktop canvas could theoretically be made to "scroll" this was not an intuitive feature for users using a keyboard or mouse to navigate about the interface. However, this was to change.

While some touchscreen displays were available in a desktop orientation and others (like Microsoft Corporation's early SURFACE brand technology) operated in a tabletop orientation, these were not portable and did not support optimum ergonomics. When Apple, Inc. introduced the IPAD touchscreen tablets on Apr. 3, 2010, users could position the device in a comfortable orientation to navigate by touch. On the software level, touchscreen navigation is operable by user "gestures." Initially, these gestures only focused on the Cartesian coordinates of a single touch point on the display and perhaps a single or double-tap on the screen to fire an event on the device. However, as the technology advanced, devices were able to detect "multi-touch" meaning that one, two or three fingers simultaneously touching the screen could signify different operations or states.

From a navigation standpoint, portable touchscreen devices presented challenges but new opportunities. The challenges were a smaller display and smaller desktop in which to show icons and controls. The new opportunities lay in the intuitive nature of sliding a desktop canvas around. Touchscreen devices lend themselves to a new navigation paradigm. For example, an optical microscope will typically only focus on a small area of a slide. As the viewer wants to see other areas of the slide they push the slide with their finger while the viewport of the microscope remains static.

By analogy, the display area of a portable device is like the viewport of the microscope . . . it only can see a small area of the entire desktop canvas. By registering gestures on the touchscreen, the desktop canvas "slides" under the display viewport in an intuitive manner. There are two types of approaches to this movement: (1) scrolling; and (2) paging.

In a scrolling approach the desktop canvas is like a large slide under a microscope and touchscreen gestures like "swipes" scroll the canvas in the direction it is pulled by the swipe gesture. This action is similar to moving a sheet of paper around a desk with a finger.

The swipe gesture may react differently depending on the speed, distance and contact on the finger on the touchscreen. For example, contacting the screen with a single finger and maintaining the finger in contact with the screen while moving the finger to the left scrolls the canvas the same distance to the left as the finger moved. Another gesture is a "flick" in which the finger moves rapidly to the left in which case the canvas continues to scroll to the left even when the finger is lifted off the screen from the flick gesture. The scrolling may have an "inertia" effect wherein the canvas initially scrolls at the speed of the flick gesture but then slows down to a stop as if the canvas is subject to some friction or other resistive force.

Screen magnification software is well-known for traditional displays coupled to desktop and laptop computers. The magnification software may be built into the operating system of the computer or may be third party applications such as those sold under the MAGIC brand by Freedom Scientific, Inc. Screen magnification software on a traditional computer display typically magnifies a portion of the screen at a user-designated magnification level (e.g., 8×). When this happens, the entire canvas of the desktop cannot be displayed because at magnification only a portion of the canvas is shown. This is frequently referred to as the "viewport." Using mouse or keyboard commands, the user would pan around the canvas (whether the background desktop, over an application in the foreground or the like). For traditional operating systems on personal computers, the boundaries of the canvas were the edges of the physical display monitor (or monitors for multi-monitor configurations). As the viewport panned to the edge of the canvas the user simply came to a hard boundary and there was nothing left to scroll to.

However, as noted above, touch-screen device operating systems frequently provide a canvas of far greater area that what can be displayed at one time. Therefore, under no magnification, the swipe gesture moves different parts of the canvas into the field of view. This becomes a problem when the touch-screen device is using screen magnification. For example, if the user is at 4× magnification, the user can only view a section of what is viewable at 1×. A user may invoke an "explore" mode by holding down a plurality of fingers onto the screen (e.g., three fingers) which moves the magnified view about the boundaries of the display at 1× but does not scroll the canvas beyond the 1× display boundaries. When the user explores up to the 1× display boundary they are required to switch into a "pan" mode to move otherwise hidden canvas into the display area. Pan mode may require change the number of fingers held down on the touchscreen (e.g., one finger) or that the user switch between dedicated touch modes (i.e operating system gestures and magnification program gestures). The user would then resume the explore mode again to view sections of the newly available canvas areas at 4×.

A drawback of the current state of the art is requiring the low-vision user to switch between explore and pan modes when coming up to a viewport boundary. What is needed in the art is a method and/or software product to detect a viewport boundary that contains additional canvas in the same direction and automatically pan the user to new canvas area without leaving the explore mode.

However, in view of the art considered as a whole at the time the present invention was made, it was not obvious to those of ordinary skill in the field of this invention how the shortcomings of the prior art could be overcome.

BRIEF SUMMARY OF THE INVENTION

The present invention is a method of navigating a touchscreen computing device under software magnification. The touchscreen computing device has a screen that is smaller than a scrollable canvas which can be panned using a touch gesture (typically with a single finger). A single viewing instance is what can be seen of the canvas at one time. A user will swipe their finger up, down, left and right to move the canvas in concert with their own finger's movement. This is much like moving a piece of paper on a desk.

A first canvas view shows a portion of this canvas wherein additional canvas exists but to view it one must scroll in another direction. However, once magnification is applied by a screen magnifier application, the end user now only sees a section of the first canvas view (which is, in turn, only a section of the entire canvas). The area viewable under magnification is called the magnification viewport. While it is known to pan around the viewport, a problem arises when the end user comes to a boundary of the first canvas view. Under the current state of the art, the user has to stop and change from one predefined, directional touchscreen gesture to another to keep moving across the boundary into a second canvas view. This second canvas view is presented by movement of the underlying canvas into view. Without changing gestures, the end user under magnification simply hits this boundary and goes nowhere unless they know to change gestures (e.g., switching from a three-finger "explore" gesture to a single-finger "pan" gesture).

The present invention advances the state of the art by automatically detecting the boundary and actuating the scrolling of the underlying canvas so that the end user can intuitively continue to explore under magnification without changing gestures.

In an embodiment of the invention, this "auto scroll" feature is configurable by the end user and can be toggled on and off. In another embodiment of the invention, exploring gestures may be invoked with inertia wherein a "flick" gesture causes the scrolling to continue even after the user lifts their finger from the touchscreen. The inertia effect typically displays velocity erosion over time. An embodiment of the invention with inertia detects whether the boundary to the next canvas view is within the magnified viewport. If it is, then a flick will carry the user onto the second canvas view by scrolling the underlying canvas. Alternatively, if the flick was invoked before the boundary is in the magnified viewport then the inertia movement would only move the viewport to the boundary edge. It would take a second "flick" to move across the boundary.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
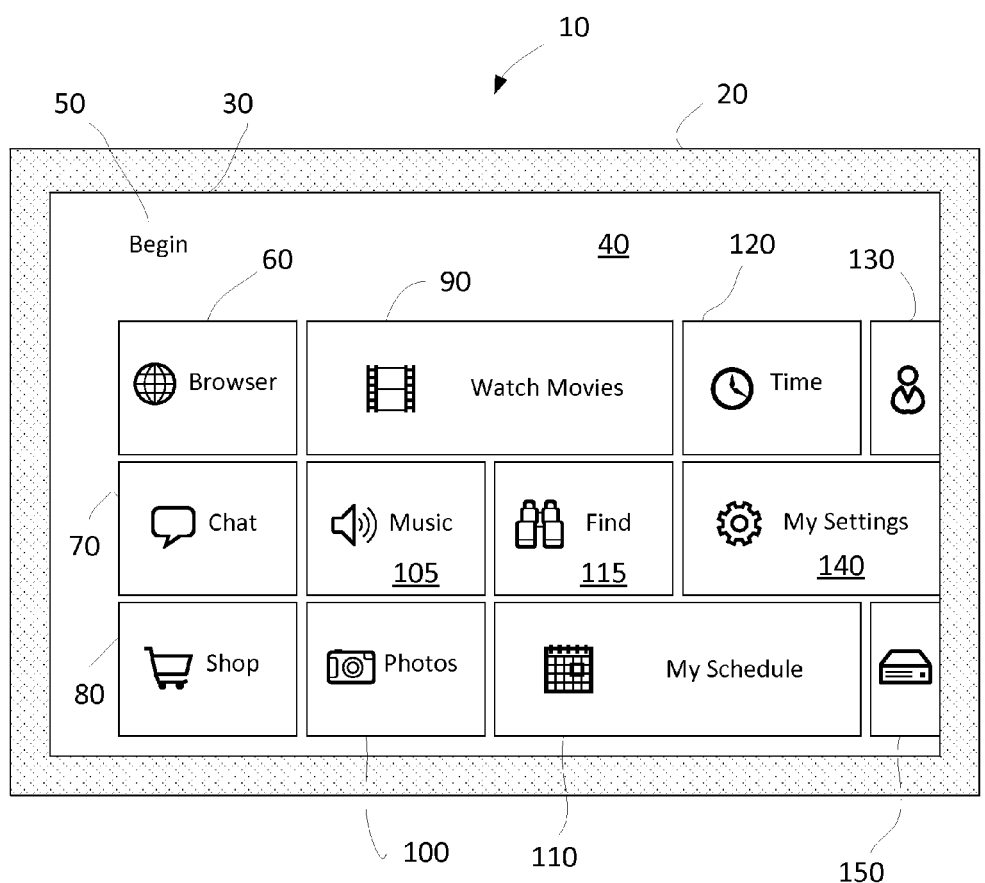
FIG. 1 is an exemplary touch-screen interface showing a left portion of a canvas menu within the display boundaries of the physical device at no magnification.

In FIG. 1, a touch screen computing device 10 has an outer case 20 and a screen perimeter 30. The GUI canvas 40 contains a "BEGIN" text link 50 and various menu controls including browser 60, chat 70, shop 80, movies 90, photos 100, music 105, schedule 110, find 115, time 120, profile 130, and files 150. It can be seen that profile 130 and files 150 are only partially viewable. Canvas 40 is larger than what can be displayed within screen perimeter 30. Responsive to a directional touchscreen gesture from right to left, the underlying canvas 40 will move as is shown in FIG. 2.

Figure 2:
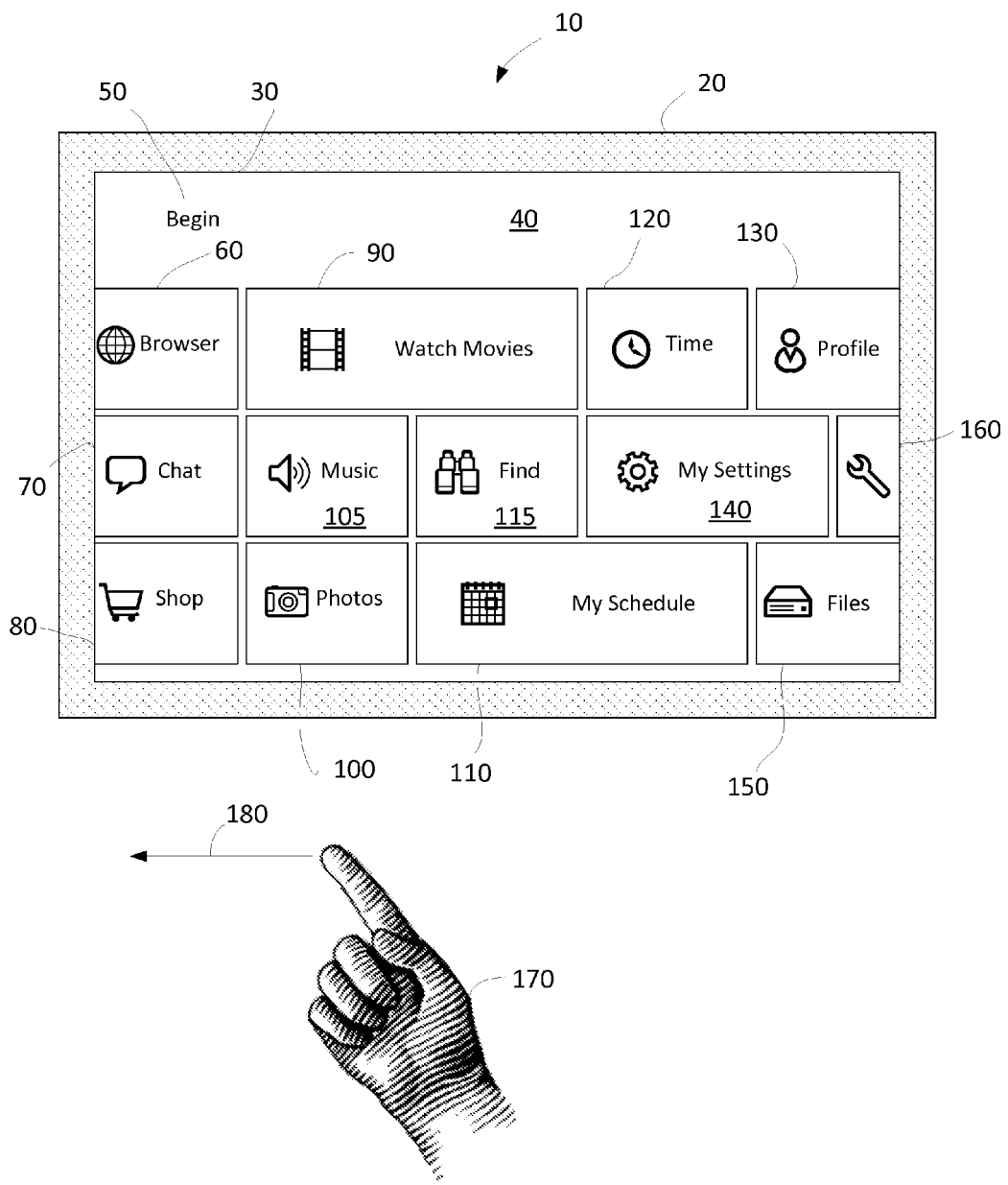
FIG. 2 is an exemplary touch-screen interface showing a single finger flick gesture that scrolls the canvas toward the left at no magnification.

In FIG. 2, gesture 170 moved in first direction 180 (from right to left) which invoked canvas 40 to scroll in concert with the gesture. It can be seen that some controls like browser 60, chat 70 and shop 80 have become juxtaposed to screen perimeter 30. However, profile 130 and files 150 are now fully in view.

Figure 3:
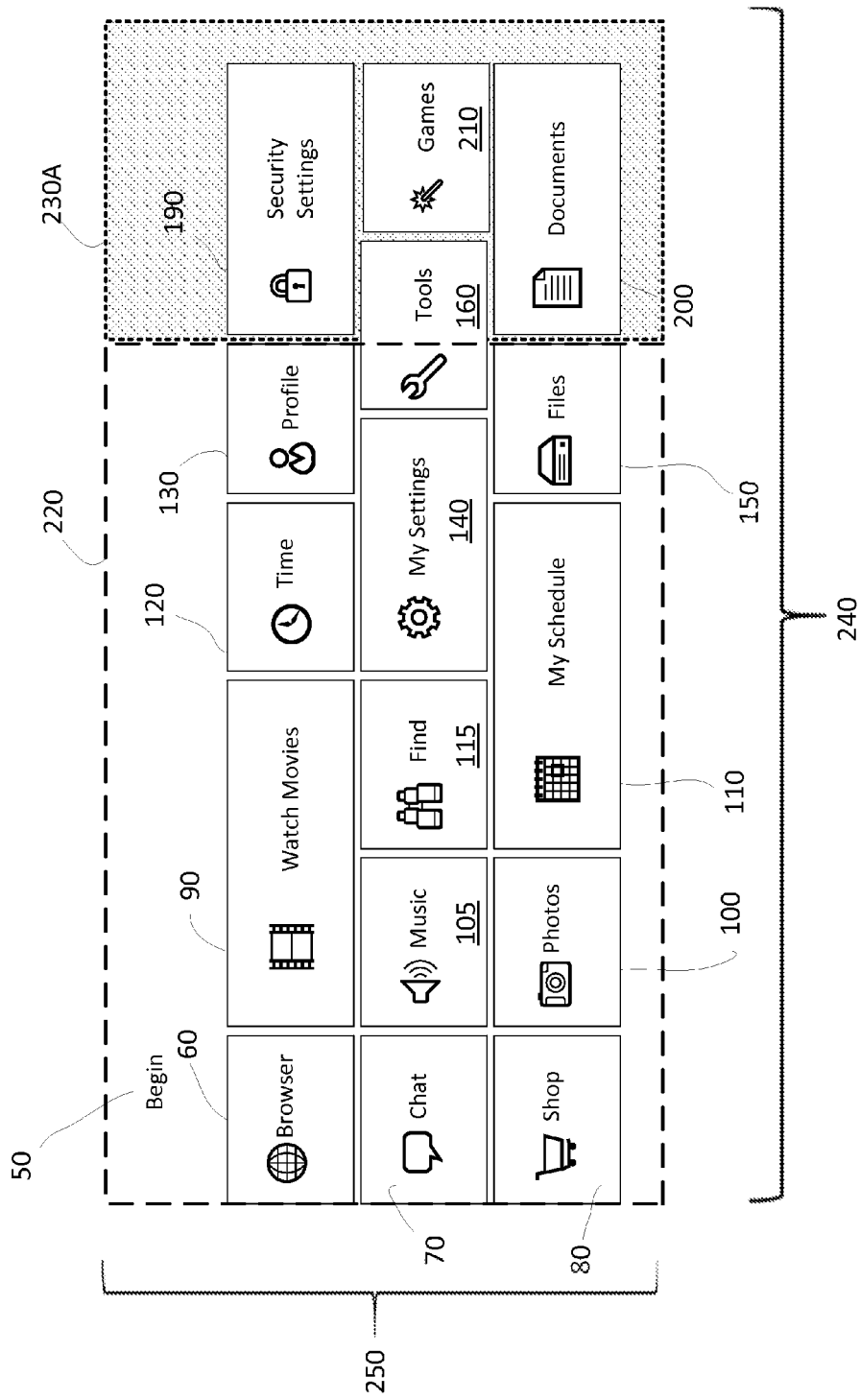
FIG. 3 is a conceptual view of the canvas sectioned between the viewable left portion of the canvas and the nonviewable right portion of the canvas due to the display limitations of the touchscreen device.

A conceptual view of canvas 40 is presented in FIG. 3. Vertical dimension 250 shows that this particular canvas and GUI only pans on a horizontal plane. However, this is just an exemplary illustration. Canvas 40 could extend up and down in an alternate embodiment of the invention. Horizontal dimension 240 is greater than the viewing area 220 which is defined by screen perimeter 30 in FIGS. 1 and 2. It can be seen that off-screen are 230A is not viewable unless the user scrolls canvas to the right to bring it into view.

Figure 4:
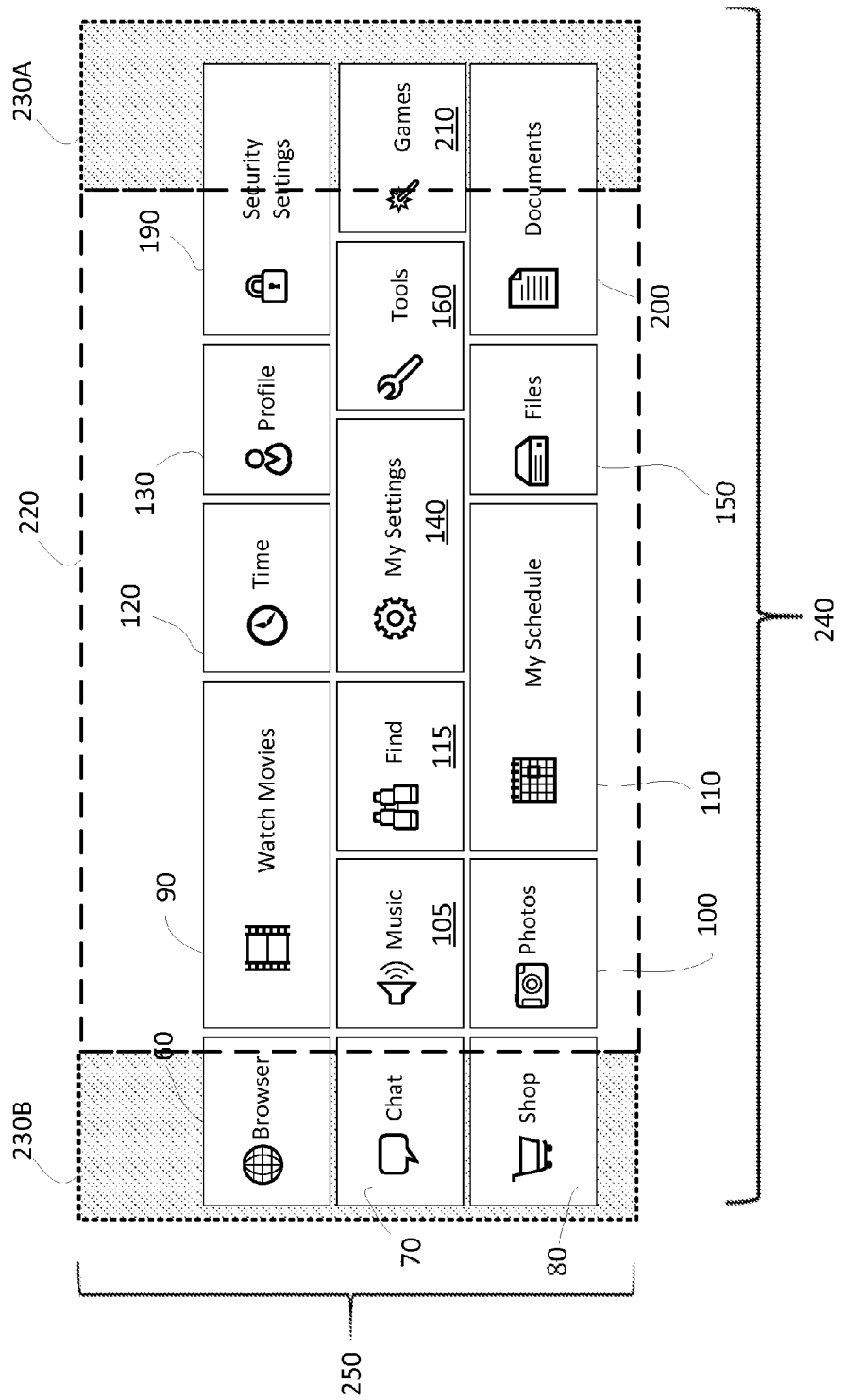
FIG. 4 is a conceptual view of the canvas sectioned between the viewable middle portion of the canvas and the hidden right and left edges of the canvas.
Figure 5:
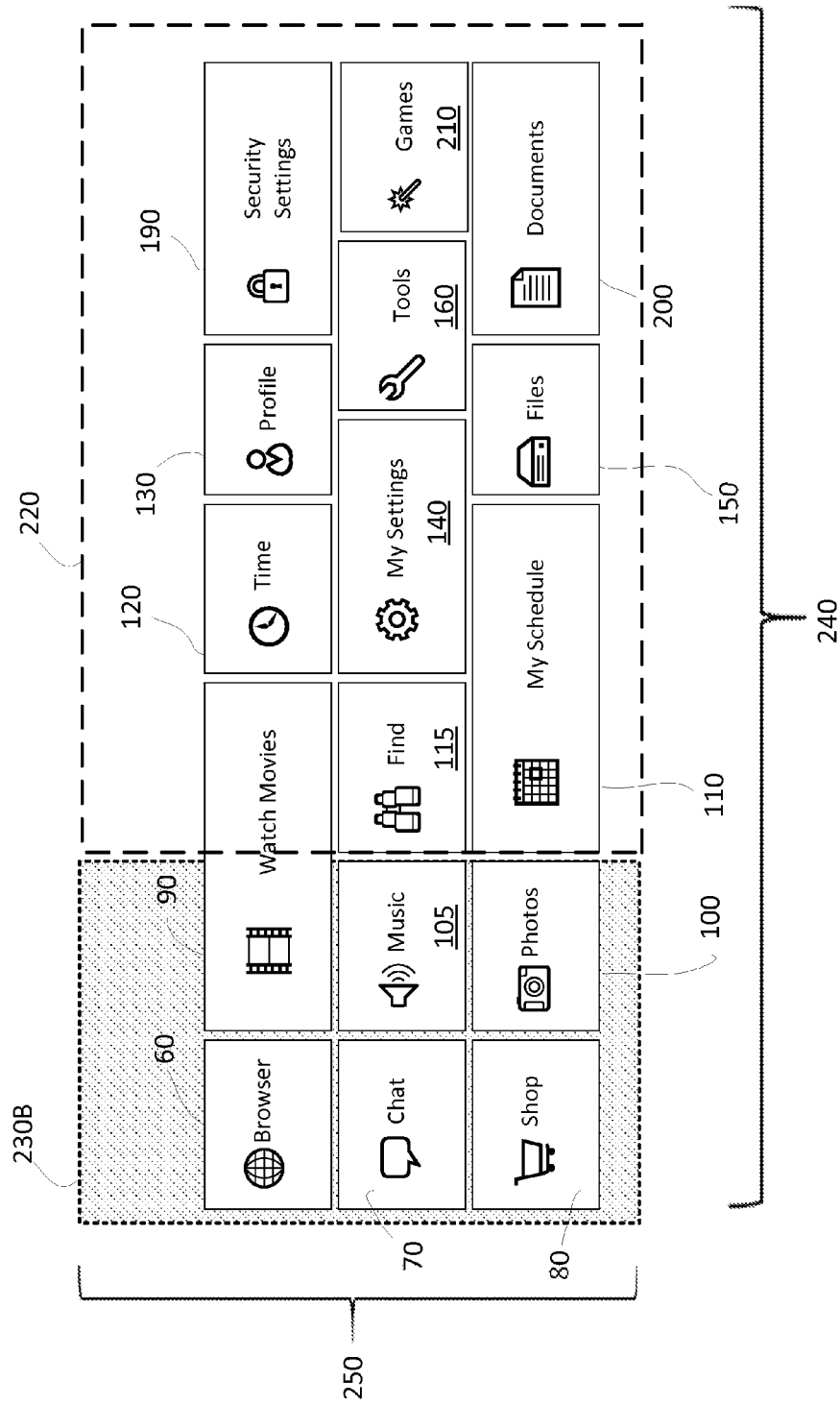
FIG. 5 is a conceptual view of the canvas sectioned between the viewable right portion of the canvas and the non-viewable left portion of the canvas due to the display limitations of the touchscreen device.

In FIG. 4, the user scrolled to the right bringing viewing area 220 into essentially the middle of canvas 40. Off screen areas 230A (right) and 230B (left) cannot be viewed in the same instance as viewing area 220. While this may initially seem inconvenient it provides the advantage of letting the system designers and users to add numerous additional controls and options to canvas 40. Therefore, the dimensional constraints of the GUI are no longer fixed. As the end user reaches the right edge of canvas 40 as shown in FIG. 5 no amount of gesturing will move canvas farther right.

Figure 6:
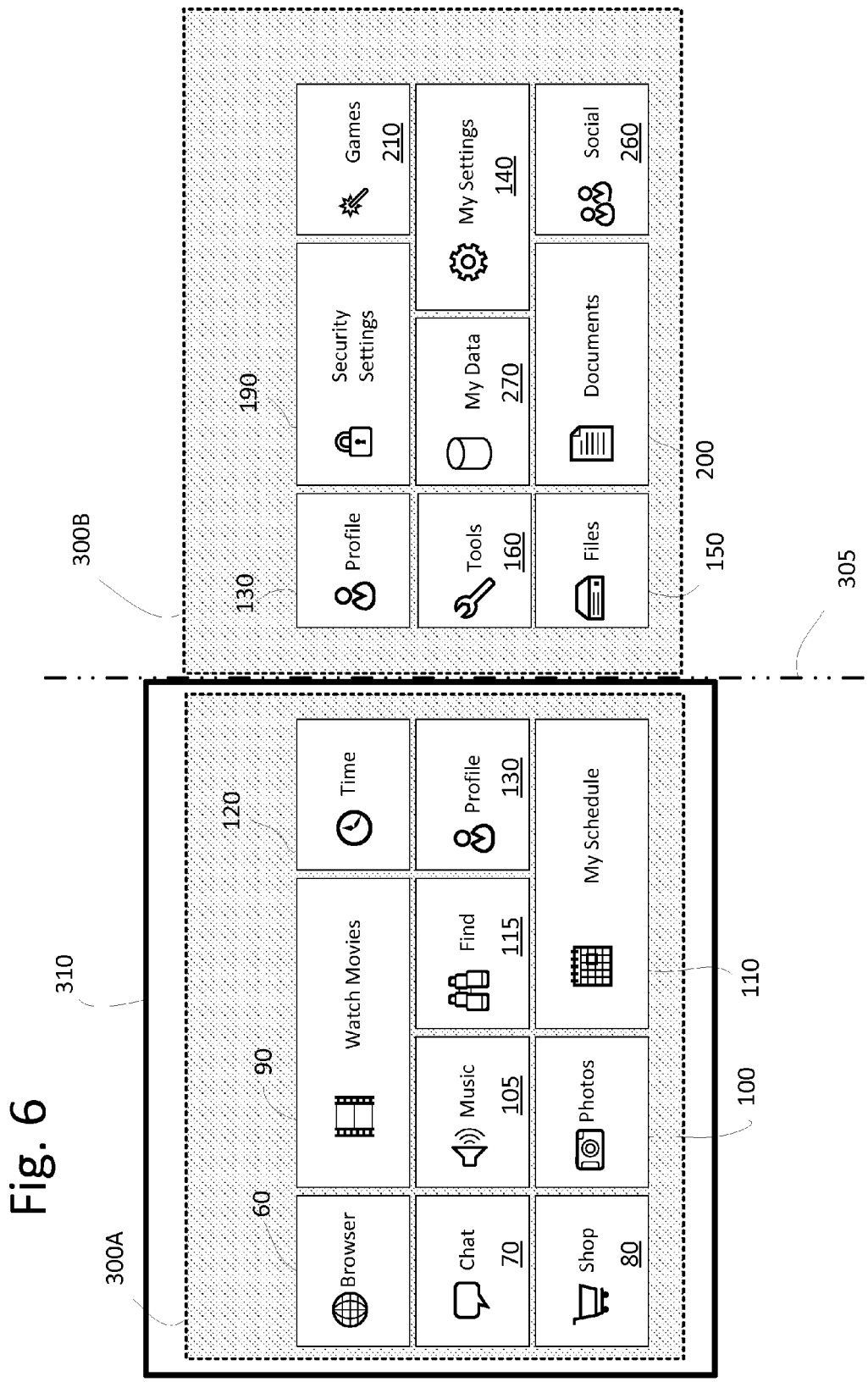
FIG. 6 is a conceptual view of the canvas in a paging metaphor wherein the left "page" of the canvas is viewable through the display device.
Figure 7:
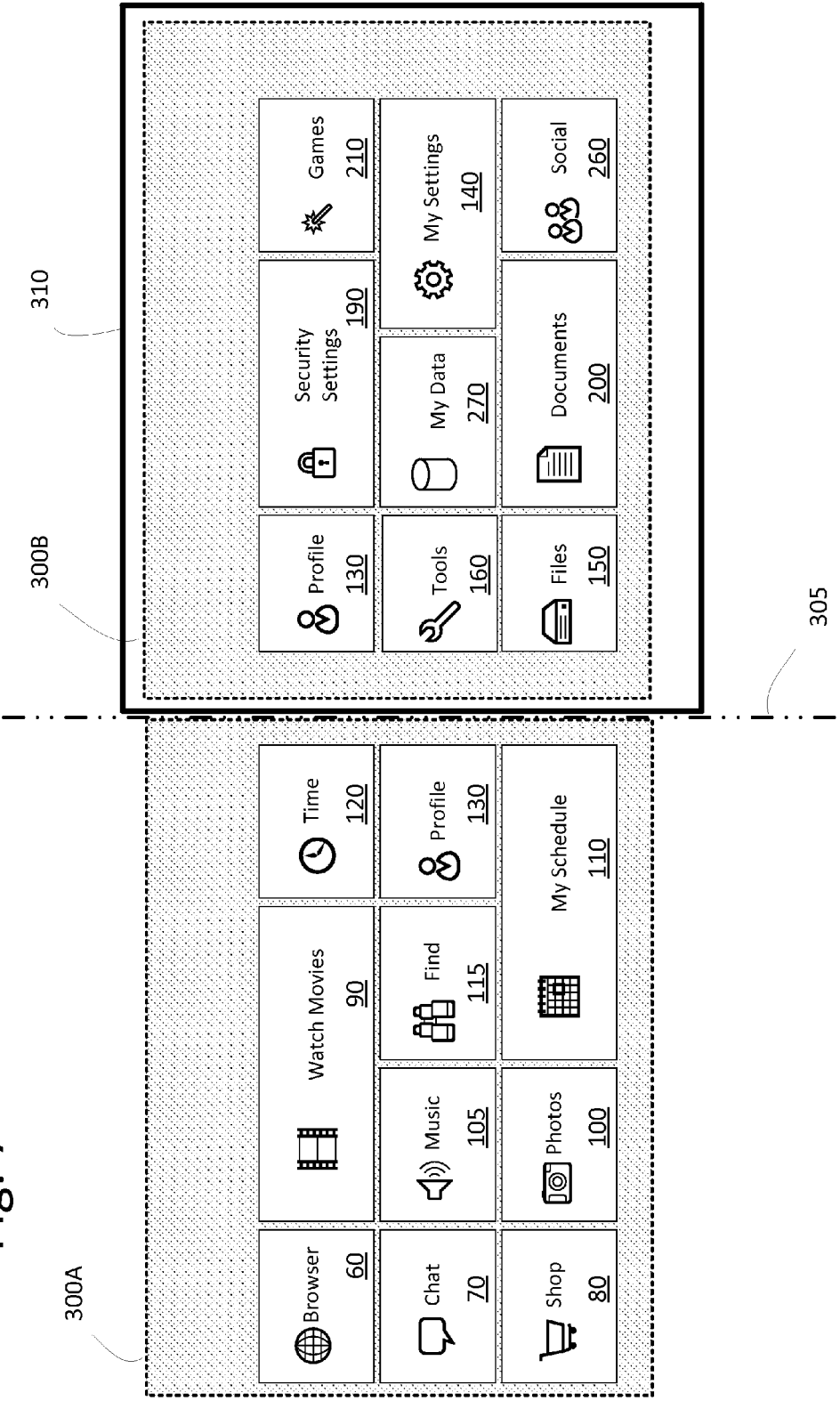
FIG. 7 is a conceptual view of the canvas in a paging metaphor wherein the right "page" of the canvas is viewable through the display device.

In FIGS. 1-5, the end user scrolled or panned over canvas 40 in a granular way. In other words, as canvas 40 moved left of right, the new content came into the field of view relatively incrementally. This is one type of GUI interaction used by Microsoft Corporation in systems sold under the SURFACE brand. An alternative GUI presentation method favored by Apple, Inc. and used in system sold under the IPHONE and IPAD brands is that of menu paging as shown in FIG. 6. A first menu 300A and a second menu 300B essentially split the canvas into two different views. The active view 310 in FIG. 6 is presented on first menu 300A. Dividing first and second menus 300A-B is conceptual boundary 305. Under non-magnified views this boundary is relatively unimportant. A simple, single-finger swipe moves between first menu 300A and second menu 300B as shown in FIG. 7.

Figure 8:
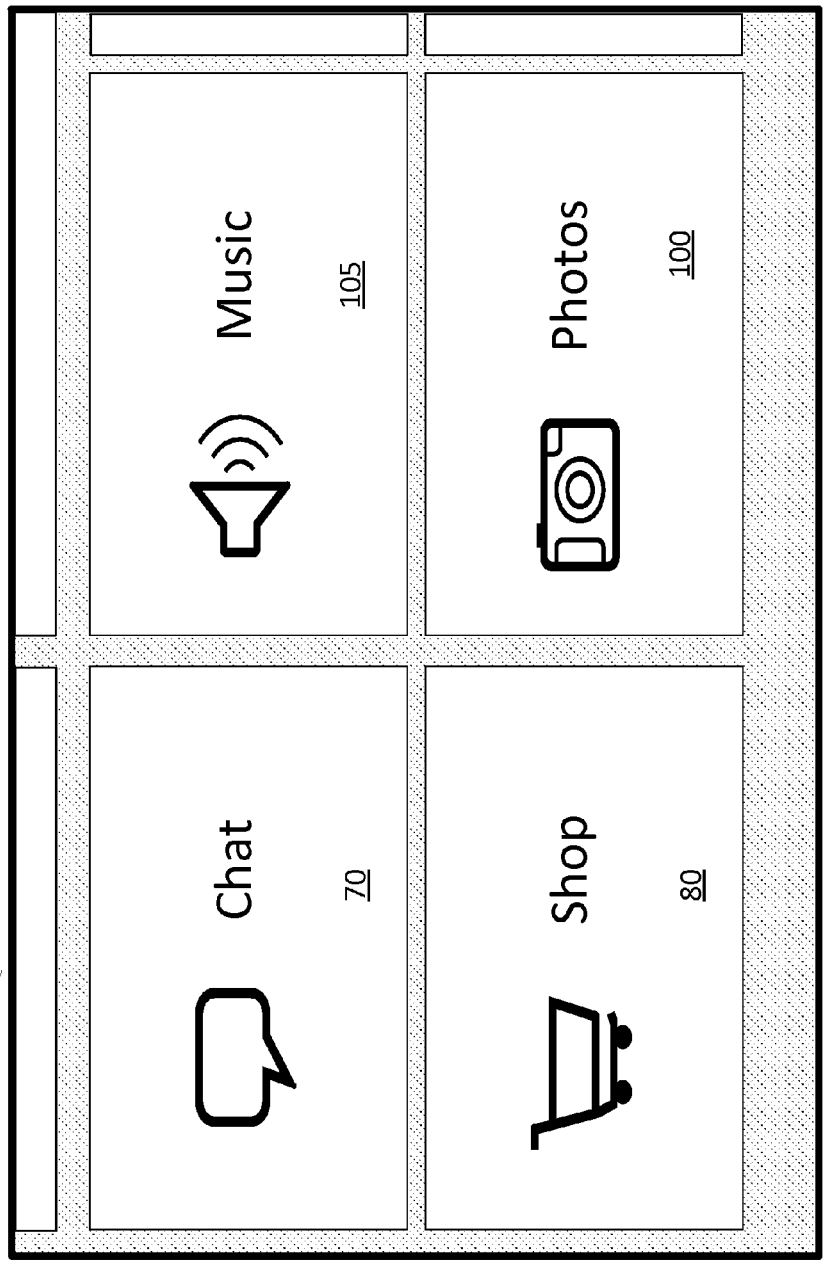
FIG. 8 is a conceptual view of a first portion of the canvas in a magnified viewport in explore mode.
Figure 9:
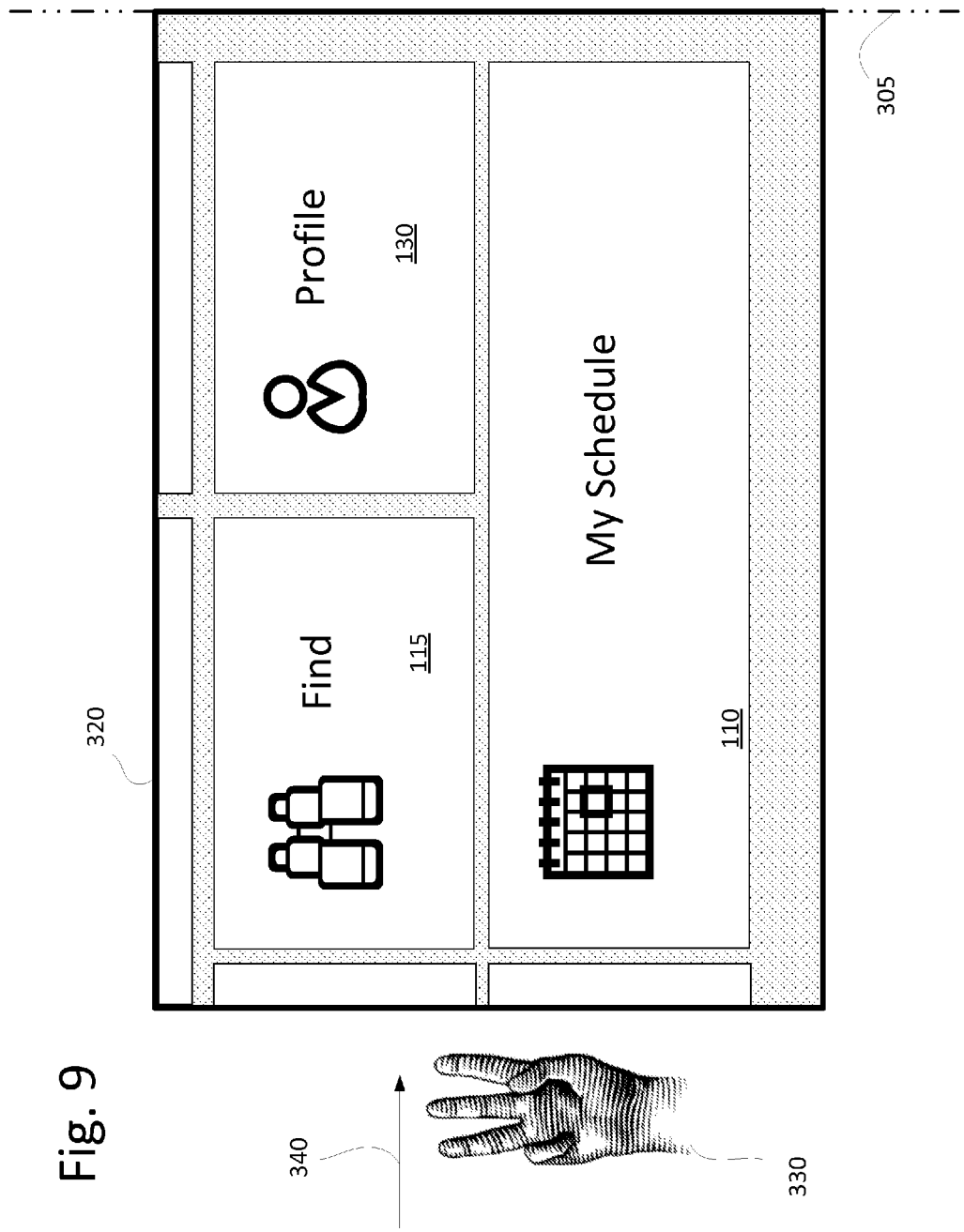
FIG. 9 is a conceptual view of a second portion of the canvas in a magnified viewport in explore mode.

However, this simplicity changes when the screen is in a magnified view as shown in FIG. 8. Magnified view 320 is centered on controls chat 70, shop 80, photos 100 and music 105. A three-finger "explore" gesture 330 is invoked in a right direction 340 causing the view to change to FIG. 9. The view in FIG. 9 shows controls find 115, schedule 110 and profile 130. However, to the right of this view is boundary 305. To the right of boundary 305 is additional canvas with more controls. However, prior to the current invention, continuing to invoke explore gesture 330 in direction 340 against boundary 305 would not move canvas 40 to bring up the additional controls. This is because explore gesture 330 operates within the boundaries of first menu 300A. To move beyond boundary 305, the user would previously have to change gestures (e.g., a single finger swipe) to move to second menu 300B.

Figure 10:
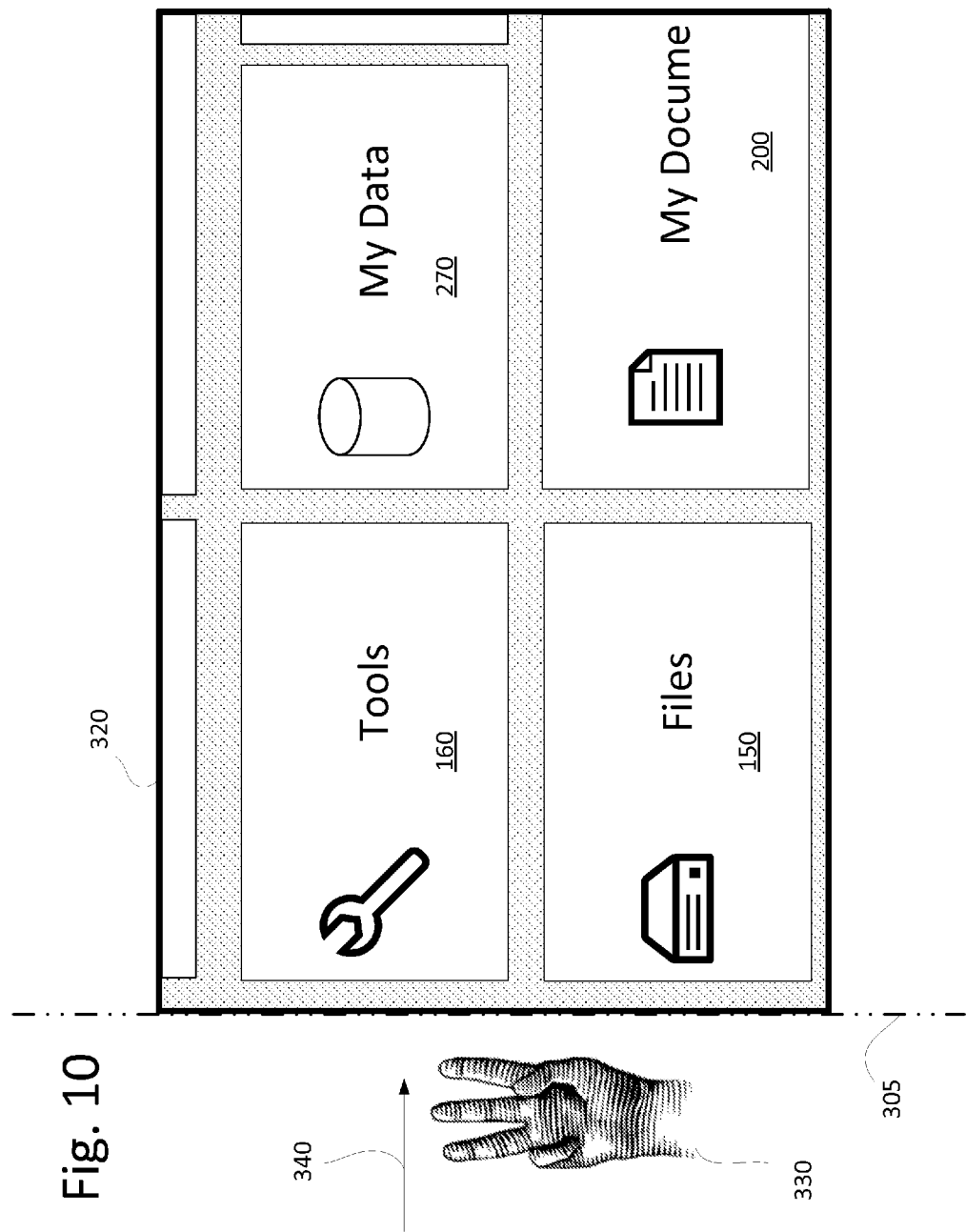
FIG. 10 is a conceptual view of a third portion of the canvas in a magnified viewport in explore mode after the canvas is paginated right according to the invention.

However, under the current invention, boundary 305 is detected and the intuitive result for the user is to keep "exploring" to the right. That means the present invention intercepts this gesture and the position of the magnified viewport. Realizing the user is attempting to explore beyond the magnified viewport, the present invention emulates a single-figure swipe to move the view of FIG. 9 into the view of FIG. 10.

Figure 11:
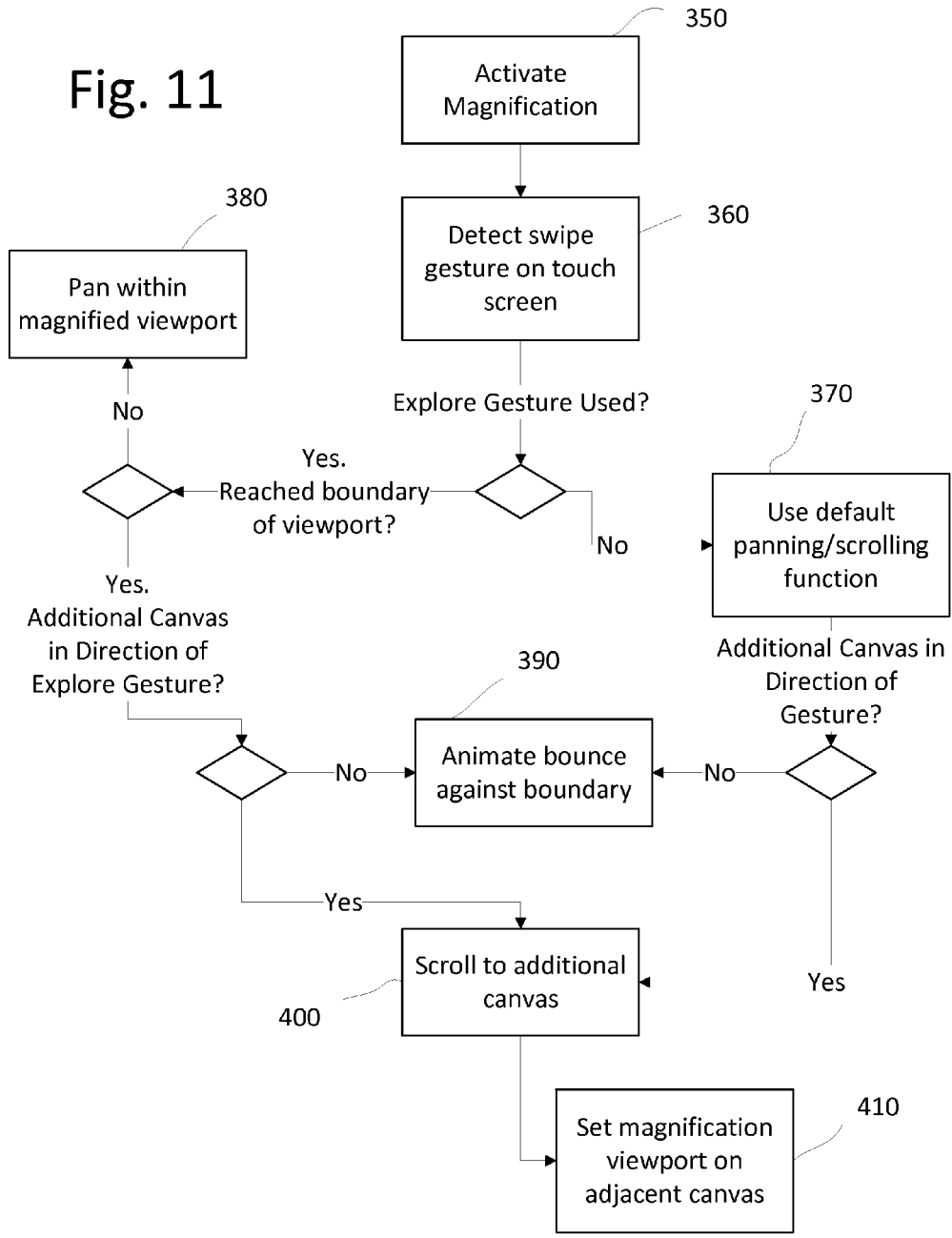
FIG. 11 is a flowchart process view of an embodiment of the invention.

An embodiment of the invention is presented as process flowchart in FIG. 11 wherein magnification is activated in step 350. A switch gesture is detected 360 and queried as to whether it is a predefined explore gesture. If not, then default panning/scrolling 370 is invoked. Alternatively, if the explore gesture is detected the next query is whether a boundary of the viewport is reached. If not, the explore gesture continues to pan within the magnified viewport 380. However, if a boundary is reached then the application queries whether additional canvas exists in the direction of the explore gesture. If not, there is no canvas to move and a visual feedback such as an animated "bounce" 390 may be displayed. Alternatively, if additional canvas does exist, the system emulates a panning gesture (typically a single-finger swipe) to scroll additional canvas 400 into view while the user is still using the same explore gesture. The application further sets the magnification viewport on the adjacent canvas 410 after the boundary is crossed.

Figure 12:
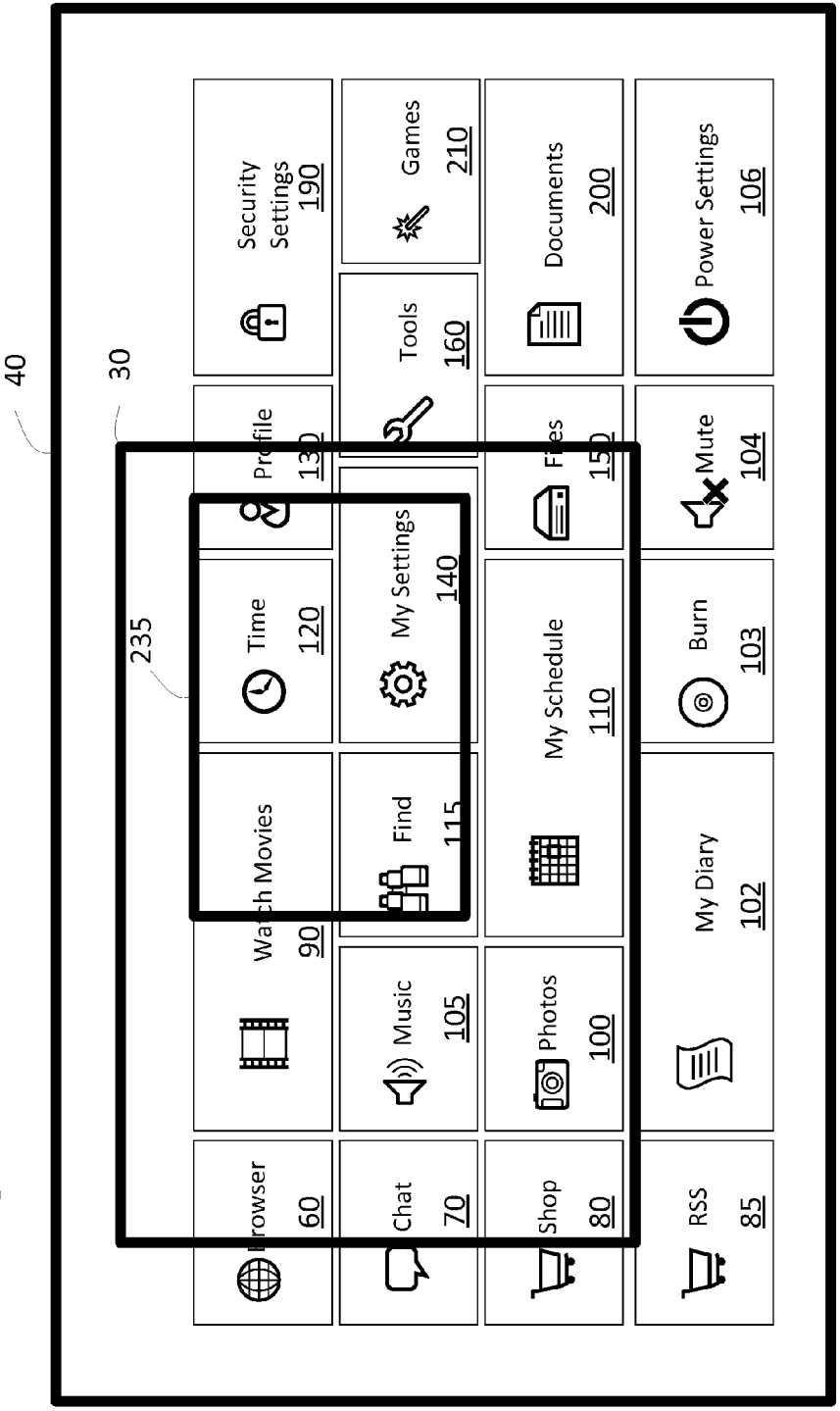
FIG. 12 is a conceptual view of relative boundaries between a canvas, screen perimeter and magnification viewport.
Figure 13:
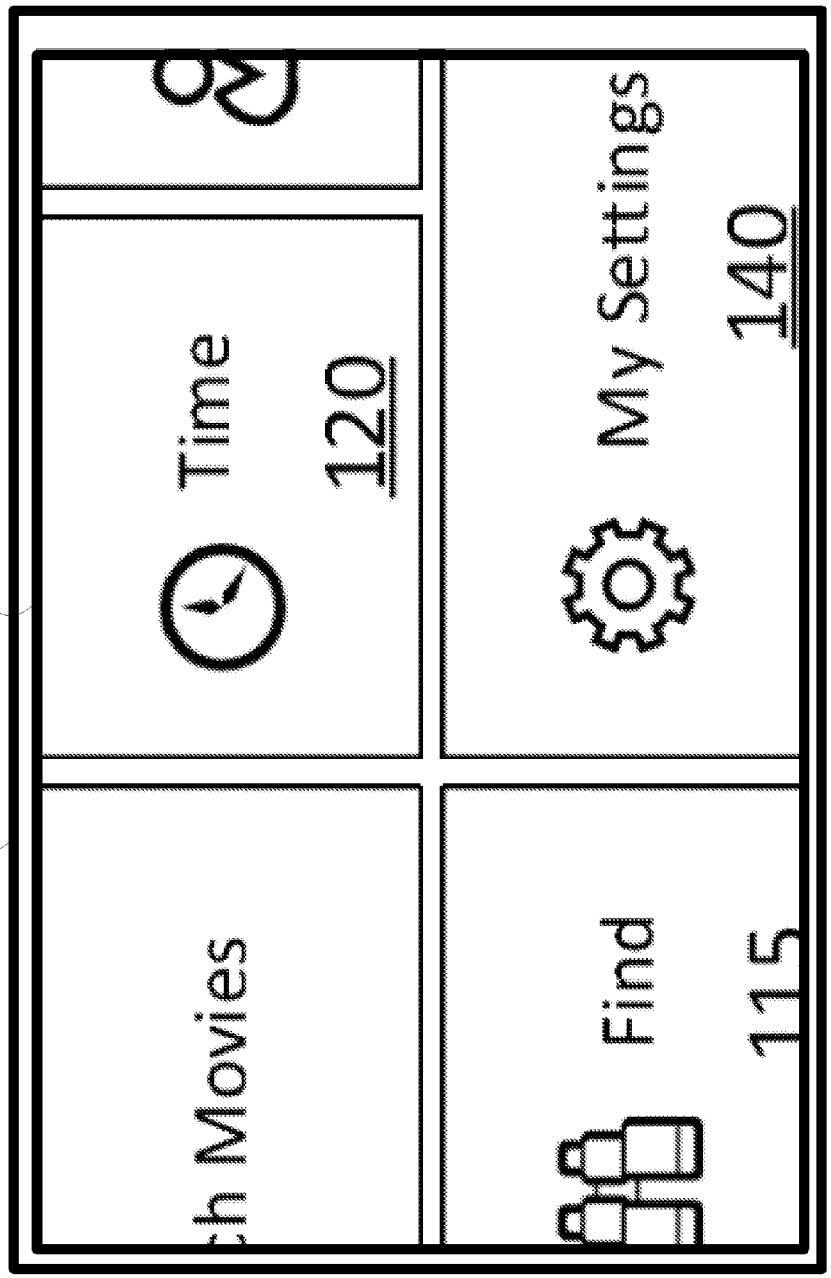
FIG. 13 is a conceptual view of a magnified viewport as seen by an end user.

FIG. 12 shows the relative boundaries between canvas 40, screen perimeter 30 and magnification viewport 235. Additional controls RSS 85, Diary 102, Burn 103, Mute 104 and Power Settings 106 were added below to show an embodiment of the invention accommodating panning on both a horizontal and vertical plan. Viewport 235 is conceptual in FIG. 12 because while under magnification, the boundaries of viewport 235 are expanded to screen perimeter 30 as shown in FIG. 13.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

GLOSSARY OF CLAIM TERMS

Active window: the focused window in the current window manager or explorer.

Canvas: a virtual container in a graphic user interface that holds drawing elements, visual controls and other objects. The canvas area may be equal to or greater than the boundaries of the display device showing the graphic user interface.

Explore: a mode of navigation to move within and possibly beyond a magnified viewport.

Gestures: are predefined motions used to interact with touchscreens. Gestures may include, but are not limited to:
1. Double tap: tap twice with one finger on surface.
2. Flick: swipe one finger left or right on surface.
3. Long press: touch surface and hold for a given time period.
4. Pan: touch surface and move one finger in any direction.
5. Pinch close: touch surface and drag two fingers together.
6. Pinch open: touch surface and drag two fingers away from each other.
7. Rotate: touch surface with two fingers and smoothly rotate clockwise or counter-clockwise.
8. Scroll: touch surface and move one finger up or down.
9. Tap: tap once with one finger on surface.
10. Three finger double tap: tap twice with three fingers on surface.
11. Three finger flick: swipe three fingers left or right on surface.
12. Three finger pan: touch surface and move three fingers in any direction.
13. Three finger tap: tap once with three fingers on surface.
14. Two finger double tap: tap twice with two fingers on surface.
15. Two finger flick: swipe two fingers left or right on surface.
16. Two finger pan: touch surface and move two fingers in any direction.
17. Two finger scroll: touch surface and move two fingers up or down.
18. Two finger tap: tap once with two fingers on surface.

Inertia: a visual effect whereby a gesture's speed and direction is correlated into a movement of the canvas with momentum that continues for a predetermined time until it slows to a stop, even after the user has lifted their finger from the touchscreen. This effect is commonly invoked after a "flick" gesture.

Multi-touch: a touchscreen's ability to recognize the presence of two or more points of contact with the surface.

Pan: the sliding of text, images or video across a monitor or display analogous to moving a camera in a panoramic shot.

Scroll: the sliding of text, images or video across a monitor or display, vertically or horizontally.

Touchscreen: an electronic visual display that the user can control through simple or multi-touch gestures by touching the screen with one or more fingers.

Viewport: display of a section of a display or canvas, often under magnification.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of navigating a touchscreen computing device under software magnification, the method comprising the steps of:
communicatively accessing the operating system of the computing device, the computing device displaying a canvas scrollable by touch gestures invoked by an end user, the canvas having a larger area than can be presented within screen edges of the touchscreen in a single viewing instance without reducing a default magnification level of the canvas, wherein the canvas is subdivided into a first canvas view and a second canvas view, the first canvas view enclosed by a conceptual boundary;
displaying the first canvas view within the screen edges;
invoking a magnification feature wherein a portion of the first canvas view is further enlarged to the screen edges of the touchscreen, a viewable area within the first canvas view defined by a magnification viewport;
panning across the first canvas view under a first magnification level until reaching the boundary of the first canvas view, the panning invoked by a first directional touchscreen gesture; and
responsive to detecting additional canvas laying beyond the boundary in the same direction as a second directional touchscreen gesture, scrolling the canvas beyond the boundary, whereby the second canvas view is presented on the touchscreen through the magnification viewport at the first magnification level;
wherein, within the magnification viewport, a first directional gesture having a first quantity of digits in contact with the touchscreen scrolls the first canvas view up to the boundary but does not scroll the canvas into the second canvas view, while the second directional gesture having a second quantity of digits different from the first quantity of digits in contact with the touchscreen scrolls the canvas across the boundary while maintaining a constant magnification level within the magnification viewport.

2. The method of claim 1 wherein the first and second canvas views are first and second menu pages respectively and scrolling across the boundary using the predefined, directional touchscreen gesture displays the second menu page under the same magnification as invoked when viewing the first menu page.

3. The method of claim 1 further comprising the steps of:
invoking inertia with the predefined, directional touchscreen gesture;
detecting if the boundary is within the magnification viewport at the time the touchscreen gesture was effected; and
scrolling the canvas into the magnification viewport if the boundary was within the magnification viewport and not scrolling the canvas if the boundary was not within the magnification view.

4. The method of claim 3 wherein the predefined, directional touchscreen gesture is a three-finger flick.

5. One or more non-transitory computer-readable media having computer-executable instructions for performing a method of running a software program on a touchscreen computing device, the computing device operating under an operating system, the method including issuing instructions from the software program comprising:

communicatively accessing the operating system of the computing device, the computing device displaying a canvas scrollable by touch gestures invoked by an end user, the canvas having a larger area than can be presented within screen edges of the touchscreen in a single viewing instance without reducing a default magnification level of the canvas, wherein the canvas is subdivided into a first canvas view and a second canvas view, the first canvas view enclosed by a conceptual boundary;

displaying the first canvas view within the screen edges;

invoking a magnification feature wherein a portion of the first canvas view is further enlarged to the screen edges of the touchscreen, a viewable area within the first canvas view defined by a magnification viewport;

panning across the first canvas view under a first magnification level until reaching the boundary of the first canvas view, the panning invoked by a first directional touchscreen gesture; and responsive to detecting additional canvas laying beyond the boundary in the same direction as a second touchscreen gesture, scrolling the canvas beyond the boundary, whereby the second canvas view is presented on the touchscreen through the magnification viewport at the first magnification level;

wherein, within the magnification viewport, a first directional gesture having a first quantity of digits in contact with the touchscreen scrolls the first canvas view up to the boundary but does not scroll the canvas into the second canvas view, while the second directional gesture having a second quantity of digits different from the first quantity of digits in contact with the touchscreen scrolls the canvas across the boundary while maintaining a constant magnification level within the magnification viewport.

6. The media of claim 5 wherein the first and second canvas views are first and second menu pages respectively and scrolling across the boundary using the predefined, directional touchscreen gesture displays the second menu page under the same magnification as invoked when viewing the first menu page.

7. The media of claim 5 further comprising the steps of:

invoking inertia with the predefined, directional touchscreen gesture;

detecting if the boundary is within the magnification viewport at the time the touchscreen gesture was effected; and scrolling the canvas into the magnification viewport if the boundary was within the magnification viewport and not scrolling the canvas if the boundary was not within the magnification view.

8. The media of claim 7 wherein the predefined, directional touchscreen gesture is a three-finger flick.

* * * * *